A. KOHLER.
Hot Air Furnace.
No. 32,427.
Patented May 28, 1861.
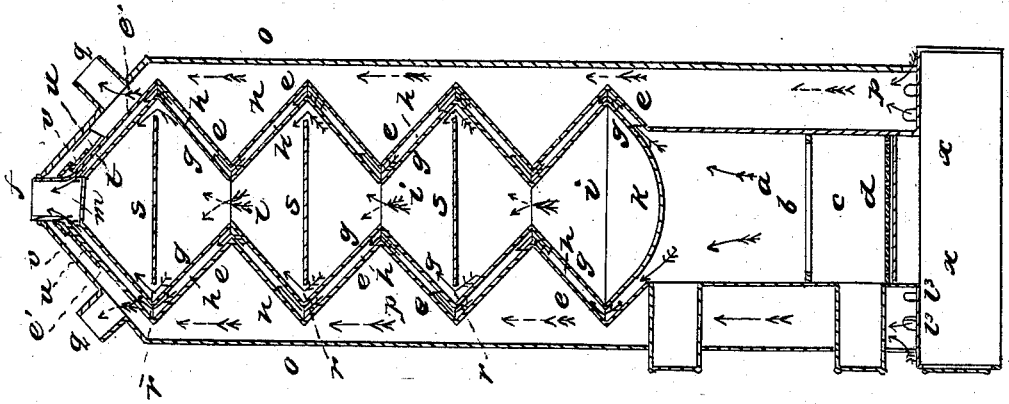
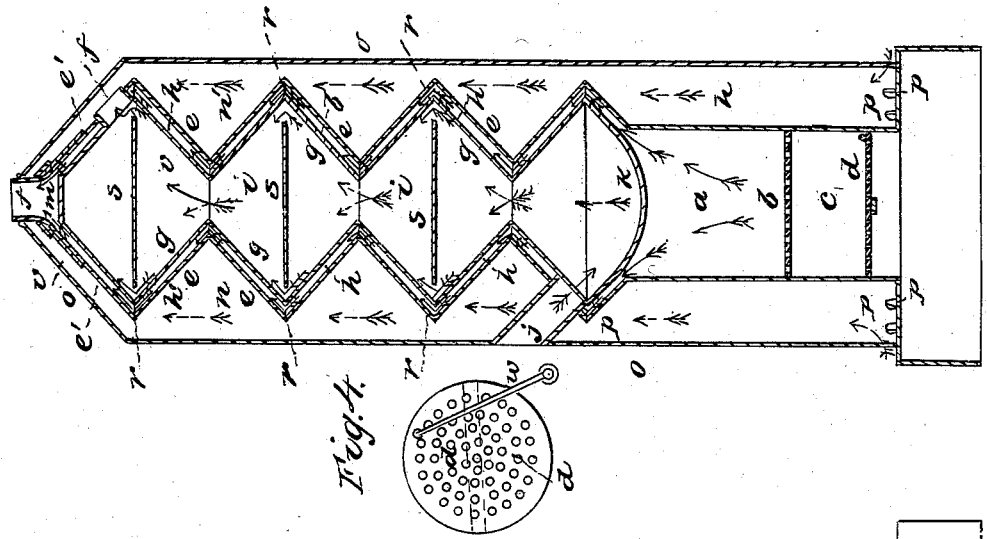
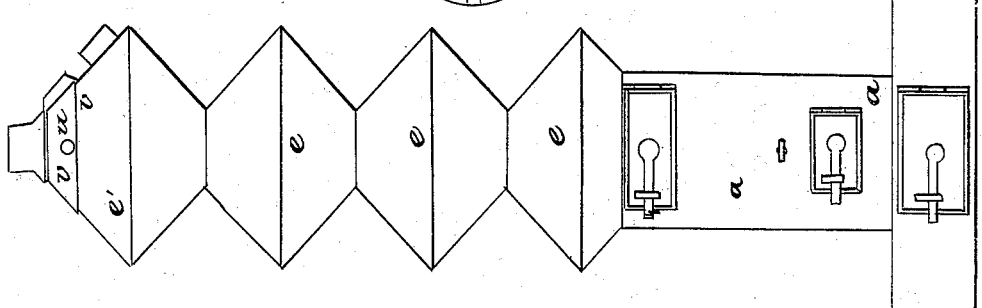
Witnesses:
Joseph Gavell
A. E. Fisher
Inventor:
Ambron Kohler

UNITED STATES PATENT OFFICE.

AMBROSE KOHLER, OF BOSTON, MASSACHUSETTS.

HEATING APPARATUS.

Specification of Letters Patent No. 32,427, dated May 28, 1861.

*To all whom it may concern:*

Be it known that I, AMBROSE KOHLER, of Boston, in the county of Suffolk and State of Massachusetts, have invented certain new and useful Improvements in Heating Apparatus, and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plate of drawings represent my improvements.

Figure 1 is a side elevation of a furnace constructed according to my improvements. Figs. 2 and 3 are central vertical sections taken in different planes. Fig. 4 is a detail view to be hereinafter referred to.

The present invention is designed for the purpose of furnishing the greatest possible amount of heat with the least expenditure of fuel in stoves, furnaces and other heating devices. To accomplish this desideratum I have constructed an apparatus which is so arranged as to cause the gases, smoke &c. evolved from the combustion of fuel, to be conducted through a devious circuit between metallic plates or shallow chambers, affording the utmost extent of radiating surfaces thus necessarily thoroughly heated are by a peculiar arrangement of devices brought in juxtaposition with and deliver their heat to, one or more currents of atmospheric air, this desirable result, moreover being effected without impeding the continuous current or draft of the products of combustion, the free delivery of which to the escape or smoke pipe—although it is desirable they should be as nearly consumed as possible—so as to extract all their latent heat—which is also effected by my improved apparatus—is absolutely essential in order to prevent unconsumed and unhealthy gases from being driven back into the apartment or apartments to be heated.

My improved heating apparatus consists of a series of vertically arranged zig-zag or conical shaped shallow chambers or flues forming a continuation of or attached to the fire-pot, in combination with either an internal arrangement of chambers into which a current of atmospheric air is introduced or with both an internal and external chamber or series of chambers supplied in a similar manner with drafts of atmospheric air—thus causing the large amount of radiating surfaces so obtained to deliver their heat to and come in contact with fresh and pure air which furthermore prevents their ultimate destruction or "burning out" that might otherwise happen from the extreme heat to which they are subjected. My new apparatus may also be used simply as a stove and furnace combined to heat both the space in which it is placed and if desirable other apartments or with but a slight change as a furnace to heat only other localities than that in which it is situated. I have also made other improvements that will be hereinafter more particularly alluded to and explained.

The general principles and objects of my improvements having thus been stated, I will now proceed to describe in detail their practical application.

*a* in the drawings represents the fire-pot of the furnace, stove &c., and made of the usual form.

*b* is the grate, *c* the ash-pit and *d* a perforated circular metallic plate placed in the same, the object of which will be hereinafter explained.

To the top of the fire-pot *a* is attached a series,—which may consist of any desired number—of truncated cones *e*, *e*, &c., alternately attached to each other at their larger and smaller bases, the extreme upper one *e′* of the series, terminating in an exit flue or pipe *f*.

*g*, *g* &c. are also a series of truncated cones, attached to each other as described of the series *e*, *e* &c., but of less diameter so as to leave a continuous but zig-zag space or channel *h*, between the outer and inner surfaces of the two series, from the fire-pot *a* to the exit flue or pipe *f*. The extreme upper and lower cones of the series *g*, *g*, &c. being closed at their ends. By thus constructing and arranging the truncated cones $g$, $g$ &c. an air-chamber $i$ is formed in the interior of the cones $e$, $e$, &c. into which cold air is admitted through an inlet pipe $j$ so placed near the bottom of the same, that, when the air first enters the air-chamber $i$, it will impinge directly against the bottom plate $k$ of the same, the beneficial results of which will be hereinafter stated.

$l$ is an outlet pipe for the air in the chamber $i$ placed near the top plate $m$ of the same, which discharges the air passed through the said chamber $i$, into the chamber $n$ formed by inclosing the entire stove or furnace in an outer casing or covering $o$.

$p$, $p$ &c. are inlets in the bottom portion of the outer casing or covering $o$, for the admission of cold air to the chamber $n$, it being discharged together with that received from the internal air-chamber $i$ through outlet pipes $q$, $q$ &c. which may consist of any desired number and extend to any apartment or room of the house or building to be heated.

In the air-chamber $i$ are secured horizontal plates $s$, $s$ &c., of circular form, extending almost entirely across the larger base of the cones $g$, $g$ &c., but leaving a space $r$ between the rim or edge of the same and the cones $g$ $g$ &c.

$t$ $t$ are holes or apertures near the exit pipe $f$, in the cone $e'$ of the series $e$, $e$ &c. and $u$, $u$ corresponding holes formed in a plate $v$, bearing and swinging upon the cone $e'$, by means of which a counter draft can be produced, to that produced by the action of the chimney flue.

Having thus described the peculiar construction of my new and improved heating apparatus, I will next proceed to describe its mode of operation which is as follows; (the passage and course of all the products, smoke, gas &c. arising from the combustion of the fuel in the fire-pot $a$ of the furnace or stove being represented by red arrows and the passage and course of the cold air heated by the radiation of the heat from the surfaces of the truncated cones being represented by blue arrows in the accompanying drawings:) The currents of heat, smoke, gas, &c. arising from the combustion of fuel in the fire-pot $a$, passing upward, impinge directly against the bottom plate $k$ of the internal air-chamber $i$, then continuing their upward course pass through the flue space or channel $h$, between the outer surfaces of the series of truncated cones $g$, $g$ &c. and the inner surfaces of the series of cones $e$, $e$, &c., following its zig-zag but continuous path until they reach the exit flue $f$, at the top of the furnace or stove, to the chimney. By forming the channel or flue $h$ leading from the fire-pot $a$ to the chimney or exit flue $f$, of the zig-zag shape described, all the smoke &c. by coming with the several surfaces of the cones $e$ $e$ &c. and $g$, $g$ &c. will, before passing out at the chimney, be entirely consumed, whereby all their latent heat is extracted and conveyed to the surfaces of the truncated cones, and by them radiated to the surrounding atmosphere. These truncated cones $e$, $e$ and $g$, $g$ being thus heated by the action and passage of the products of combustion from the fire-pot to the exit flue, will impart their heat by radiation to the cold air admitted as herein above described, to the external and internal air-chambers $n$ and $i$, which air being thus heated will pass upward and combining at or near the outlets $q$, $q$ &c. may be conducted to any room or apartment desired to be heated. The plates $s$, $s$ &c. placed in the internal air-chamber $i$, serve to produce the effect of keeping the currents of air that pass through the same, more directly in contact with the surfaces of the truncated cones $g$, $g$ &c., whereby the currents of air are more thoroughly heated. By conducting the cold air into the chamber $i$ as above described, through the pipe $j$ so as to impinge directly upon the bottom plate $k$ (intensely heated from the fire-pot), it will be evident that it immediately becomes very hot and also that the said plate $k$ is prevented from becoming deteriorated or destroyed by the excessive heat to which it would be otherwise exposed. The plate $d$ perforated and placed in the bottom portion of the ash-pit $c$ of the furnace or stove, can have an intermittent rotary motion imparted, by a forward and backward movement being given to the rod $w$ attached to the same, whereby the ashes falling from the fire pot $a$ can be sifted, without being removed from the ash-pit $c$, the fine dust and small particles passing through the holes or apertures of the same into the pit $x$, below the plate $d$.

It will be evident that the outer casing or covering $o$ can be dispensed with, when it is desired to heat the room or apartment, in which the apparatus is placed and also that for the purposes of a gas-stove, my improvements are particularly applicable for by giving to the currents of heat arising from the combustion of the gas, the continuous but zig-zag course herein described, all the noxious and unhealthy vapors or gases arising therefrom will be entirely consumed or destroyed.

Having thus described my invention, I shall state my claims as follows:

1. The combination of a series of truncated cones united at their larger and smaller bases alternately as described and surrounded by a series of similar cones of such diameter as to leave an annular zig-zag space between them—with inlet and outlet pipes, so arranged as to admit of cold air within the interior of the former series of cones by impinging and reverberating it against the highly heated surfaces thereof and to discharge it when thus heated, substantially as described.

2. In combination with the double series of cones and inlet and outlet pipes arranged to operate as set forth, the outer cylinder provided with openings at their bottom for the admission of cold air as specified.

AMBROSE KOHLER.

Witnesses:
JOSEPH GAVETT,
A. E. FISHER.